SEARCH MEMORY ARRAY

Filed Jan. 4, 1960

INVENTORS
ARTHUR V. POHM
RICHARD M. SANDERS
BY Cushman, Darby + Cushman
ATTORNEYS United States Patent Office 3,193,806
Patented July 6, 1965

3,193,806
SEARCH MEMORY ARRAY

Arthur V. Pohm, Ames, Iowa, and Richard M. Sanders, St. Paul, Minn., assignors to Sperry Rand Corporation, New York, N.Y., a corporation of Delaware Filed Jan. 4, 1960, Ser. No. 292
7 Claims. (Cl. 340—174)

The present invention relates generally to magnetic apparatus used to store binary information in digital computing machines and more specifically to a novel arrangement of the components and associated circuitry to obtain a magnetic memory which has a parallel interrogation capability.

Conventional prior art magnetic memories can be interrogated solely in a serial manner. That is to say, when searching such memories for a word of information having an unknown memory location, each storage register in the memory must be addressed in a sequential manner until the presence or absence of the word being sought is determined. By properly utilizing the novel arrangement of components and associated circuitry of the present invention, it is possible to simultaneously search all storage registers in the memory for the desired data, or alternately to serially address the memory in the conventional manner with additional wiring but without requiring additional magnetic elements.

In a copending patent application Serial No. 691,202, filed October 23, 1957, now Patent Number 3,015,807 entitled "Non-destructive Sensing of a Magnetic Core," there is described means for non-destructively reading the binary contents from a ferromagnetic storage element. The means described includes, in one embodiment, a pair of thin film magnetic cores such as the uniaxial anisotropy type prepared by vacuum deposition in the presence of an orienting magnetic field in accordance with the Rubens Patent No. 2,900,282. The films prepared in this manner are found to have a hysteresis characteristic which is very nearly rectangular in the preferred or so-called "easy" direction of magnetization and hence are very well suited to the storage of binary information. However, limitation to cores prepared by this method is not intended.

Binary information is stored by placing the remanent magnetization of one of the films in the abovementioned film pair, called the memory film, in one or the other of its two stable states. One stable state corresponds to a binary "1," while the other stable state corresponds to a binary "0." The other film, called the readout film, is oriented with its easy magnetization direction at right angles to that of the memory film, so that the external field of the memory element acts as a transverse field upon the readout film. Reading is accomplished by the application of a sequence of external field pulses which are sufficient to reverse and to restore to its original state the magnetization of the readout film when the memory film magnetization is in one of its remanent states, but which are insufficient to do so when the memory film is in the other of its remanent states.

The present invention utilizes a similar arrangement of core pairs and associated circuitry. A plurality of memory elements is arranged in a plurality of rows and columns thereby forming a two or three dimensional matrix. Each memory element includes a pair of film cores each of which has physical properties which may be identical to those of the corresponding cores described in connection with Patent Number 3,015,807. Information is stored in groups of these memory elements called word registers by placing one of the cores of each core pair in the register called the memory core, in one or the other of its remanent states and by arranging the known core settings in a known digit order. The other core of each core pair, termed the readout core, is oriented so that the preferred axis thereof along which the readout core remanent magnetization lies in its unbiased state is at an angle, preferably a right angle to the corresponding preferred axis of its associated memory core. Furthermore, each memory film has an external field produced by the remanent magnetization thereof which biases the magnetization of its associated readout film relatively strongly, while the external field of each readout core has a relatively weak influence on the remanent magnetization of its associated memory film. A plurality of interrogate or drive lines are inductively coupled one to all of the readout cores in each row of core pairs for applying a plurality of transverse magnetic fields one to each readout core of a selected row of core paris. Another plurality of drive lines is inductively coupled to all the readout cores in the matrix for applying longitudinal fields thereto. A plurality of sense lines are inductively coupled a different one to all readout cores of each word register for providing an output when any of the readout cores coupled thereto switches state. As mentioned before, the sought word is identified by known core settings in a known digit order. A plurality of signals corresponding to the known core settings of the sought word are applied one to each interrogate line in the known digit order. A plurality of magnetic fields is thereby produced and applied by the interrogate lines to the memory elements coupled thereto in such a manner that all the readout cores in each digit level receive a field which corresponds to the known memory core setting in that digit level of the sought word. The external field of the memory core acting upon the readout core will be canceled at memory elements storing the sought information and reinforced at those memory elements storing the opposite information. At each digit level, the remanent magnetization of the readout core in each memory element storing the sought information will lie along its preferred axis in an unbiased condition, due to the abovementioned field cancellation, while the remanent magnetization of the readout core of the remaining memory elements will be in a biased condition, i.e., lying at an angle to its respective preferred axis. A plurality of longitudinal magnetic fields, i.e., fields parallel to the preferred axis of each readout core and antiparallel to the direction of the remanent magnetization thereof when in an unbiased condition, applied to each memory element during the existence of the first plurality of fields causes the readout cores which have their remanent magnetization lying at an angle to their preferred axis to rotationally switch states while causing substantially no rotation of the remanent magnetization of the readout cores which have their remanent magnetization in the unbiased condition, and therefore no switching of states thereof occurs. A substantial signal is induced in each sense line coupled to a core which switches state while only a small noise signal is induced in the sense lines coupled to cores which do not switch states. The noise signals may be converted into an absence of a signal by suitable external equipment. The absence of a signal on a sense line is indicative that the sought word is stored in the register associated therewith. By reversing the polarity of the plurality of longitudinal fields subsequent to application thereof in the abovementioned direction but still during the application of the transverse fields, those cores which switched states will again switch states and upon relaxation of all interrogate and drive fields the remanent magnetization of each readout core assumes its original position.

It is therefore a primary object of this invention to provide an improved magnetic core memory all the registers of which can be simultaneously searched to determine the location of information identified by known core settings but unknown in storage location.

Another object of this invention is to provide a magnetic memory having a non-destructive simultaneous search capability.

A further object of this invention is to provide a search memory utilizing data-biasing techniques to obtain parallel sensing of all the word registers in the memory.

Still another object of this invention is to provide a search memory utilizing data-biasing techniques to obtain parallel sensing of all word registers or identical portions thereof in the memory.

Other objects of this invention will become apparent to those of ordinary skill in the art by reference to the following detailed description of the apparatus and the appended claims. The various features of the apparatus used according to this invention may best be understood with reference to the accompanying drawings wherein:

Figure 1:
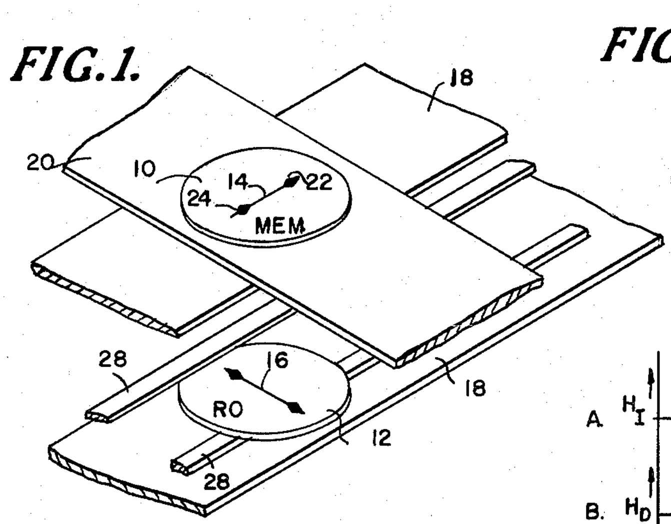
FIGURE 1 illustrates the arrangement of film cores and associated windings of one storage element.

In FIGURE 1 there is shown, in an exploded view, a magnetic element composed of a pair of binary magnetic cores 10 and 12. Cores 10 and 12 are thin magnetic films preferably of the uniaxial anisotropic type with each having a single preferred or easy axis of magnetization, along which the remanent magnetization thereof lies in either of two opposite directions representing two stable states, and a difficult or hard axis transverse to the easy axis. Film 10 is termed the memory film and film 12 is the readout film. The abovementioned preferred axes of films 10 and 12 are respectively indicated by vectors 14 and 16. The films may be deposited on or otherwise attached to suitable substrates (not shown). The films are oriented such that the preferred axis of one is at an angle, preferably, but not necessarily, a right angle to the preferred axis of the other. Furthermore film 10 has the property that the external field caused by the remanent magnetization thereof influences the magnetization of film 12 relatively strongly while the external field of film 12 caused by the remanent magnetization thereof influences the magnetization of film 10 relatively weakly. In other words, the field set up by the remanent magnetization of film 10 biases the remanent magnetization of film 12. Film 12 has the additional property that when it is biased by a suitable external field, i.e., a field having a substantial component transverse to its easy axis of magnetization, the remanent magnetization thereof can be rotationally switched by the application of a longitudinal field, i.e., a field parallel to its easy magnetization axis.

Two windings or drive lines 18 are illustrated but only one is required. When two are employed, they may be connected as a parallel-strip transmission line for better coupling to the cores of the field they produce. Each line 18 is oriented physically perpendicular to the preferred axis 16 of readout core 12 so that a pair of alternate polarity current pulses passed therethrough produce field pulses parallel to the preferred axis 16, the first of which tends to switch film 12 to its opposite remanent state and the second of which tends to restore film 12 to its original remanent state. These field pulses are insufficient in magnitude to switch and restore the remanent magnetization of film 12, however, unless there is applied to film 12 during the existence thereof, a field having a substantial component transverse to its preferred remanent magnetization axis 16. In the preferred embodiment the entire field is applied transverse and is produced in part by the external field of film 10 and in part by a current flowing through winding 20. Winding 20, as seen from FIGURE 1, is oriented so as to produce a field parallel to the preferred axis 14 of memory core 10 and is thus, in the preferred embodiment, physically oriented parallel to the preferred axis 16 of readout core 12. The magnitude of the current in winding 20 is such as to produce a field at film 12 equal in magnitude to the average static field existing at film 12 due to the external field of film 10. If these two transverse fields add, the remanent magnetization of core 12 is biased such that the longitudinal field pulses on film 12 due to the current pulses in winding 18 are sufficient to switch and restore film 12 by rotation of its remanent magnetization. If the transverse fields cancel, the remanent magnetization of core 12 is lying along the preferred axis 16 in its unbiased condition, and therefore the application of any longitudinal field pulse to core 12 at that time does not switch either core.

Binary information is stored in film 10 as the direction of remanent magnetization. By definition, a binary "1" may be considered as being stored in memory film 10 when the film is in the remanent state of magnetization indicated by arrowhead 22 on vector 14. Similarly, a binary "0" is defined as being stored in the memory film 10 when the film is in the remanent state of magnetization as represented by arrowhead 24. Hence the transverse biasing field on film 12 due to film 10 is of opposite directions for a stored "0" and a stored "1." Therefore, with a current of one sense in winding 20, the field produced thereby will add to the field produced by core 10 when it is in one remanent state, for example, the "0" state, and will subtract from the field produced by core 10 when it is in its other stable state, for example, its "1" state. The application of a longitudinal field pulse applied during the existence of the field from winding 20 and directed opposite to the direction of the remanent magnetization of core 12 when lying along its preferred axis 16 will thus rotationally switch the remanent magnetization thereof when a "0" is stored in core 10 but not when a "1" is stored therein. With a current of opposite sense in winding 20, film 12 will switch when a "1" is stored but not when a "0" is stored.

Figure 2:
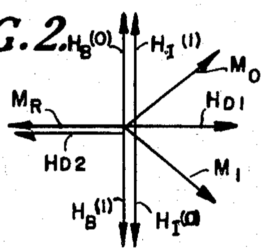
FIGURE 2 illustrates vectorially the various fields that may be applied to one storage element during a read cycle and the corresponding direction of the readout film magnetization.
Figure 3:
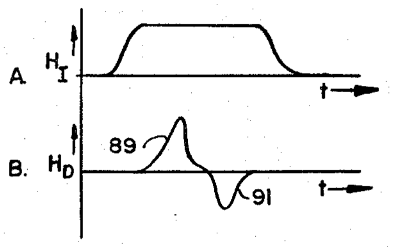
FIGURE 3 illustrates the time relationships of the externally applied fields at the readout film during a read cycle.

The operation of the non-destructive sensing of binary information according to the foregoing detailed description may best be summarized with reference to the vector diagram of FIGURE 2. The remanent magnetization of readout core 12 may be as represented by vector $M_R$. Assume for the first instance that memory core 10 is storing a binary "0." The field applied to memory core 12 thereby is represented by vector $H_B(0)$. When a current pulse is applied to winding 20, a transverse field of the shape for example as shown in FIGURE 3A and as represented by vector $H_I(0)$ is produced. Since the magnitudes of field $H_B(0)$ and field $H_I(0)$ are preferably made equal and they are oppositely directed as shown in FIGURE 2, the fields cancel. The net effect of the two fields in combination therefore on the remanent magnetization of readout core 12 is to cause no rotation thereof. Longitudinal field pulses of the shape for example as shown in 3B are applied during the existence of the $H_I(0)$ field. From FIGURE 3, it is apparent that the transverse field is applied first in time, and the longitudinal fields are applied during the existence of the transverse field, i.e., that the FIGURE 3A filed pulse timewise embraces the FIGURE 3B field pulses. Field pulse 89 caused by a current pulse applied on winding 18 is directed as shown by vector $H_{D1}$ antiparallel to the direction of the core 12 remanent magnetization when lying in its unbiased state as represented by vector $M_R$. Field pulse 91 caused by a current pulse of opposite polarity on line 18 produces a field $H_{D2}$ which is oppositely directed to that of $H_{D1}$. Both fields $H_{D1}$ and $H_{D2}$ are made insufficient in magnitude to switch the remanent magnetization $M_R$ when it is in its unbiased state to its opposite state. That is, due to the cancellation of the $H_B(0)$ field by the $H_I(0)$ field, the remanent magnetization $M_R$ is in its unbiased condition and therefore is not rotated or switched by either of the longitudinal field pulse $H_{D1}$ or $H_{D2}$. These pulses therefore cause only at most a small noise signal to be induced in sense lines 28, only one of which is required, two when connected as a parallel-strip transmission line being preferred for better pick-up. This small signal is indicative that a "0" is stored in memory core 10.

Assume now in the second instance that a binary "1" is stored in the memory core 10. The field produced thereby on core 12 is represented by vector $H_B(1)$. Now when the transverse field pulse of the shape shown in FIGURE 3A and directed as shown by vector $H_I(0)$ is applied to core 12 it adds to the $H_B(1)$ field, causing an effective transverse field on core 12 double what it was due to the $H_B(1)$ field alone, assuming the $H_I(0)$ field equals the $H_B(1)$ field in magnitude which is not a necessary condition. The total field thereby applied to core 12 rotates vector $M_R$ and causes it to assume a biased position. The longitudinal field is again applied in the same time sequence as before. The positive portion 89 of the pulse shown in 3B causes the field $H_{D1}$ to be applied in a direction antiparallel to the direction of remanent magnetization vector $M_R$ thereby when in its unbiased position causing the remanent magnetization vector $M_R$ to be switched to the position represented vectorially in FIGURE 2 as $M_1$. The negative portion 91 of the longitudinal field as represented vectorially by $H_{D2}$ returns the magnetization vector $M_R$ to its original biased state and upon relaxation of field $H_I(0)$, $M_R$ returns to its original position. The switching of the remanent magnetization of $M_R$ of readout core 12 causes a substantial voltage to be induced in sense line 28 thereby being indicative that a binary "1" is stored in memory film 10. By reversing the direction of the transverse field, and applying the respective fields in the same time sequence as above described, a small noise signal will result from output line 28 when a binary "1" is stored in memory film 10, while a substantial signal will result therefrom when a binary "0" is stored in memory film 10.

The foregoing principles may be utilized in forming a memory capable of non-destructive parallel sensing of all the word registers contained within the memory as now described in detail.

Figures 4, 5:
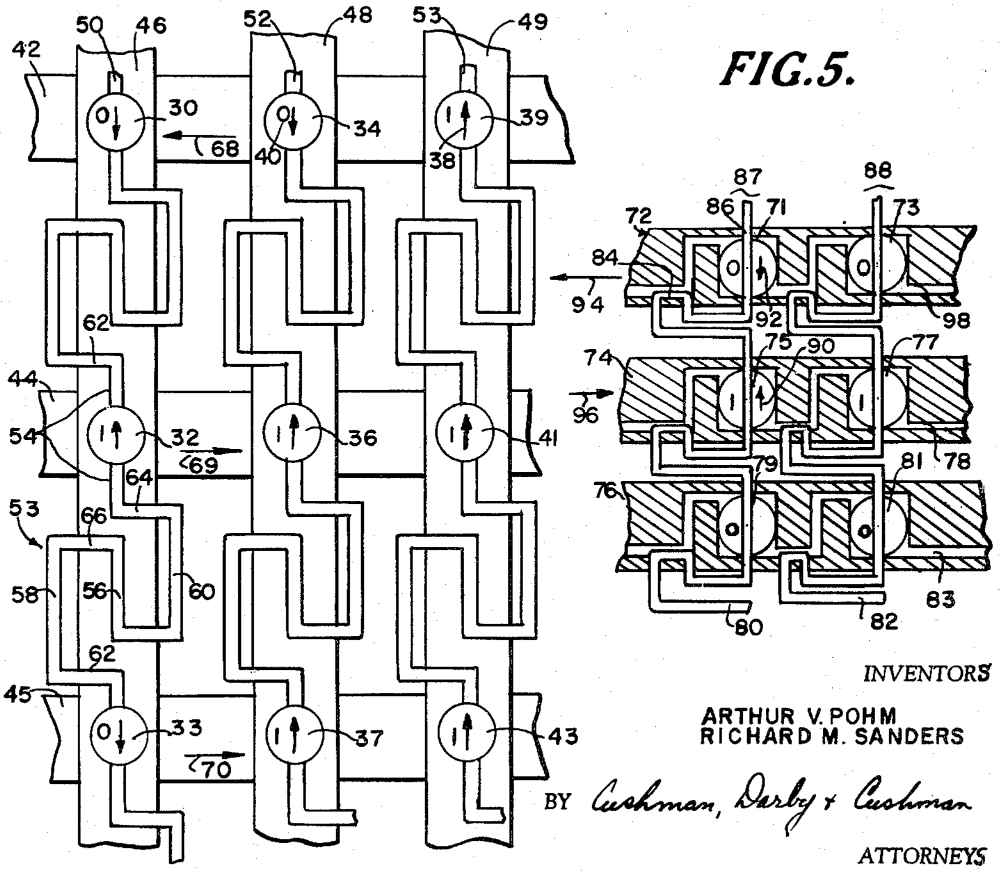
FIGURE 4 shows a memory matrix and its associated windings having a parallel search capability.
FIGURE 5 shows a memory matrix employing an alternative arrangement of windings.

FIGURE 4 illustrates a top or plan view of one embodiment of this invention. Although only a 3 x 3 array is shown, i.e., a three word memory having a word length of three bits, it should be understood that the invention is not intended to be limited to this particular configuration. In fact by increasing the number of rows and columns it is possible to obtain a search memory having an arbitrary number of words and an arbitrary word length without departing from the scope of the invention. Further, by using a folded construction of the memory plane shown in FIGURE 4, it is possible to construct a three dimensional array using the inventive concepts contained herein.

Memory films 30, 32 and 33 form the storage elements of a first word register; memory films 34, 36 and 37 form the storage elements of a second word register; and memory films 39, 41 and 43 form the storage elements of a third register. For the purpose of illustration it is arbitrarily assumed that a binary "1" is stored in a memory film when it is magnetized in the direction indicated by vector 38 and that a binary "0" is stored when the film is magnetized in the direction indicated by vector 40. Thus in the first register, the binary word "010" is stored; in the second word register, the binary word "011" is stored; and in the third word register the binary word "111" is stored. A plurality of interrogate lines 42, 44 and 45 in FIGURE 4, are provided one for each row of cores or each digit position and are employed to apply simultaneously the appropriate interrogate $H_I$ fields, one to all the readout films occupying each digit level. Since FIGURE 4 is a plan view, the readout film associated with each memory film is not shown in that illustration. However, it is to be understood that each memory film in FIGURE 4 has an associated readout film as in FIGURE 1, and that the readout film of each core-pair in FIGURE 4 is oriented with its easy axis at a right angle to the easy axis of the memory film.

A second plurality of windings, 46, 48 and 49 in FIGURE 4, are inductively coupled one to each column of readout films associated with a different word. These windings are drive lines used to apply the longitudinal field $H_D$ to the readout films at all the digit positions of all word registers simultaneously. A third plurality of windings, shown as sense lines 50, 52 and 53 are inductively coupled one to all readout films in each word register in such a manner that all the signals induced therein by the switching of individual readout films inductively coupled thereto are of the same polarity. The respective orientation of the various windings and of the preferred axis of each film pair in the region of inductive coupling therebetween is identical to that as shown in FIGURE 1 and as hereinbefore described. If the drive line and sense line for each word register were arranged parallel to one another for their full length, undesirable direct coupling therebetween might occur. Therefore, some means should be provided for eliminating any signals induced in the sense winding caused by the application of the drive field itself. To accomplish this, preferably each segment of the respective sense lines between adjacent memory elements in a register, such as segment 53 of line 50, is made to resemble a squared "S" so that any signal induced in segment 54 by current on line 46 is of opposite polarity to that induced in leg 56 of the "S" segment. With this winding configuration, any signal induced in segment 54 of winding 50 upon the application of the drive field by winding 46 is canceled by the signal induced in segment 56 of winding 50, providing the lengths of segments 54 and 56 are substantially the same. Sense line segments 58 and 60 are disposed far enough from drive line 46 that any drive field due to current in line 46 does not induce any appreciable signal in either of those segments. Also, since segments 62, 64 and 66 are perpendicular to the axis of drive line 46 they are not influenced to any appreciable extent upon the application of a drive field by winding 46. Each sense line in the matrix is arranged in a similar manner.

A plurality of signals having polarities corresponding to the known core settings of the sought information is applied in the known digit order to the plurality of interrogate lines. The field thereby applied to each core coupled thereto cancels the biasing field $H_B$ existing from each memory film at the storage locations containing the same information as the corresponding digit position in the sought word and adds to the biasing field $H_B$ at the digit position containing the opposite information. Under these circumstances, when a set of drive current pulses are simultaneously applied to the drive windings 46, 48 and 49, thereby producing a plurality of longitudinal field pulses $H_D$, the sense winding associated with each word register storing the sought information has no switching signals induced therein, while every other sense line produces a substantial output pulse due to the readout cores coupled thereto switching state.

Considering the memory matrix as shown in FIGURE 4 and the information therein contained, assume it is desired to search the memory for the presence of the word "011." Under operating conditions, the data contained in the memory is normally unknown. However, for the purpose of explaining the function of the memory it will be assumed that the contents of the word registers are known. To locate the above word, current pulses for producing a plurality of fields of magnitude preferably, though not necessarily, fully equal to the remanent magnetization external field from each memory core as existing at each readout core are applied simultaneously to interrogate windings 42, 44 and 45. The polarities of these current pulses correspond to the known digit settings of the word "011," i.e., the current pulse in winding 42 is in the direction shown by arrow 68, in winding 44 by arrow 69, and in winding 45 by arrow 70. The resulting interrogate field $H_I$ applied by line 42 cancels the biasing field $H_B$ from memory films 30 and 34 while adding to the biasing field $H_B$ in memory element 39. The interrogate field as applied by line 44 cancels the biasing field $H_B$ from memory elements 32, 36 and 41, while the interrogate filed as applied by line 45 cancels the biasing field from memory elements 37 and 43 and reinforces the biasing field from memory element 33. A plurality of longitudinal drive fields produced by currents as illustrated in FIGURE 3B are applied during the existence of the plurality of interrogate fields to all of the readout films by respective current flow through drive windings 46, 48 and 49. The memory elements having a biasing field reinforced by an interrogate field, i.e., elements 33 and 39, will have their respectively associated readout films switched by the longitudinal field applied thereto. However, the remaining readout cores will have their remanent magnetization substantially unaffected since the remanent magnetization of each such remaining readout core lies in its unbiased state due to the cancellation of the respective $H_B$ and $H_I$ fields applied thereto. As stated before the magnitude of the field applied longitudinally to the easy axis of a readout core is insufficient to switch the remanent magnetization of that readout core when the magnetization thereof exists in its unbiased state, i.e., parallel to its easy axis. Thus, if any, only a small noise signal will result. In FIGURE 4 it may be seen that sense line 52 is the only line associated with a word register wherein none of the readout cores coupled thereto have switched state. Sense line 52 therefore will have only a small noise signal induced thereon which may be converted into an absence of an output signal by suitable external equipment if desired. This small or absent output signal resulting during the application of the plurality of interrogate and drive fields is an indication that the sought word is contained in the word register associated with the sense line on which such a signal occurs.

The time relationships of any one of the plurality of interrogate fields and any one of the plurality of longitudinal fields are shown in FIGURE 3. As before, the positive portion 89 of the drive field pulse produces a longitudinal field $H_{D1}$ in each readout film coupled thereto which field is directed antiparallel to the unbiased position of the remanent magnetization thereof and which, when combined with the reinforced biasing field, causes the remanent magnetization of each readout film having the reinforced biasing field applied thereto to be reversed. The negative portion 91 of the pulse produces a longitudinal field $H_{D2}$ in each readout film coupled thereto in the opposite direction to that produced by the positive portion 89. The negative portion 91 therefore restores each readout film to its original state of magnetization if its state has been changed by the application of the positive portion 89 but does not change the state of any readout film not previously changed by pulse 89 during the same interrogation period.

Another embodiment of this invention containing memory elements 71, 73, 75, 77, 79 and 81 is shown in FIGURE 5 with the respectively associated readout films again not being illustrated in this plan view but oriented as per FIGURE 1 and its description. Here, a 3 x 2 array is illustrated but, as with FIGURE 4, this is not intended to limit the invention. The interrogate windings 72, 74 and 76, shown cross hatched for greater clarity, are oriented and perform the same function as interrogate lines 42, 44 and 45 in FIGURE 4. However, in the embodiment of FIGURE 5 the drive windings 98, 78 and 83, which correspond to drive lines 46, 48 and 49 in FIGURE 4, are relocated such that there is a separate drive line for each digit level of any given word register. Note, however, that each drive line 98, 78 and 83 is wound so as to produce a longitudinal field with respect to the readout core remanent magnetization of each memory element coupled thereto. Sense lines 80 and 82 correspond to the FIGURE 4 sense lines 50 and 52. Each is physically oriented in accordance with the previously described sense line 50 orientation, e.g., sense line 80 has a segment 84 which cancels any signal induced on segment 86 by current flowing in line 98. The chief advantage of the drive line configuration in FIGURE 5 is that it is possible thereby to search for the presence of a preselected digit or group of digits rather than a complete word.

The operation when searching for all word identified by a common group of digits rather than a complete word is best understood by considering a specific example. In FIGURE 5, there are two word registers 87 and 88. Word register 87 contains the binary word "010" while register 88 contains the word "010." (It has been arbitrarily assumed that a "1" is stored by biasing the memory core in a direction indicated by arrow 90, while a "0" is stored by biasing the memory core in a direction indicated by arrow 92.) As above indicated, the respective readout film cores of each memory elements have not been shown. However, each memory elements and its associated windings are as represented in FIGURE 1 in the region of inductive coupling. Assume now that it is desired to locate all the words identified by the common digits "01." Current pulses having directions as indicated by arrows 94 and 96 are respectively applied simultaneously to lines 72 and 74. These pulses each produce transverse fields of the shape shown in FIGURE 3A and respectively apply the same to memory elements 71, 73, 75 and 77. The transverse field applied by line 72 cancels the memory core biasing field as applied to the readout cores associated with memory elements 71 and 73. The transverse field applied by line 74, which is oppositely directed to the transverse field coupling cores 71 and 73, cancels the memory core biasing field as applied to the readout cores associated with memory elements 75 and 77. A plurality of longitudinal field pulses of the shape and time relationship shown in FIGURE 3B applied to elements 71, 73, 75 and 77 by current pulses flowing in drive lines 98 and 78 therefore causes no rotation of the remanent magnetization of the readout cores associated with elements 71, 73, 75 and 77. Thus only a small noise signal is induced on sense lines 80 and 82. This is indicative that the words having the common identifier "01" are stored in the word registers respectively coupled by those sense lines, i.e., registers 87 and 88. It is clear that by increasing the number of memory elements and their associated windings, a much larger memory matrix may be constructed in accordance with this invention.

Thus it is apparent there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A memory matrix comprising a plurality of first magnetic cores arranged in a plurality of rows and columns, each core having one preferred axis of magnetization along which the remanent magnetization thereof may lie in either of two opposite directions respectively representing two stable states of remanent magnetization, said matrix storing information in said columns by predetermined magnetization settings of said first cores in a known digit order, and means for nondestructively searching at least one core in each of the plurality of core columns simultaneously for information identified by known core magnetization settings in known digit order but unknown in column location, said means including a plurality of second magnetic cores inductively coupled one to each of said first cores thereby forming a plurality of core pairs, each second core having one preferred axis of magnetization along which the remanent magnetization thereof may lie in either of two opposing directions respectively representing two states of remanent magnetization and being oriented to have its said preferred axis at an angle to the said preferred axis of the first core inductively coupled thereto, each first core producing a first magnetic field having a direction dependent on the remanent state thereof for rotating the remanent magnetization of the second core inductively coupled thereto, means including a plurality of first drive lines respectively associated with given rows of core pairs for simultaneously applying to the second cores thereof a plurality of second magnetic fields in response to a first plurality of signals carried respectively by said first drive lines and corresponding in polarity to the known core setting of the sought information and applied to the plurality of first lines in the known digit order, the said drive lines being oriented so that each second field is applied in the same direction as or antiparallel to the respective first field according to the polarity of the signal causing that second field and the remanent state of the associated first core, any second field applied in the same direction as the respective first field being effective to rotate the remanent magnetization of the second core coupled thereto further from its preferred axis to a biased position, and any second field applied in the opposite direction to the respective first field being effective to rotate the remanent magnetization of the second core coupled thereto to a substantially unbiased position along its preferred axis, a plurality of second drive lines inductively coupled to said second cores for applying when respectively activated by a plurality of signals a third magnetic field thereto in each of the second cores inductively coupled thereto in a direction substantially antiparallel to the remanent magnetization thereof when lying parallel to its respective preferred axis of magnetization, each third field being insufficient in magnitude to switch the remanent state of any second core which has its remanent magnetization existing substantially in said unbiased position but being sufficient in magnitude to switch any second core which has its remanent magnetization existing at said biased position and output means including a plurality of output lines inductively coupled to all the second cores in each column and oriented so that the magnetic axis of each lies parallel to the said preferred axis of each second core coupled there at least in the region of coupling, each of said output lines including means for substantially cancelling any signals induced therein by direct coupling thereto of any third field, said output means arranged for producing an output signal due to the change of state of any of said second cores.

2. A memory matrix comprising a plurality of first magnetic cores arranged in a plurality of rows and columns, each core having one preferred axis of magnetization along which the remanent magnetization thereof may lie in either of two opposite directions respectively representing two stable states of remanent magnetization, said matrix storing information in said columns by predetermined magnetization settings of said first cores in a known digit order, and means for nondestructively searching at least one core in each of a plurality of core columns simultaneously for information identified by known core magnetization settings in known digit order but unknown in column location, said means including a plurality of second magnetic cores inductively coupled one to each of said first cores thereby forming a plurality of core pairs, each second core having one preferred axis of magnetization along which the remanent magnetization thereof may lie in either of two opposing directions respectively representing two states of remanent magnetization and being oriented to have its said preferred axis at an angle to the said preferred axis of the first core inductively coupled thereto, each first core producing a first magnetic field having a direction dependent on the remanent state thereof for rotating the remanent magnetization of the second core inductively coupled thereto, means including a plurality of first drive lines respectively associated with given rows of core pairs for simultaneously applying to the second cores thereof a plurality of second magnetic fields in response to a first plurality of signals carried respectively by said first drive lines and corresponding in polarity to the known core setting of the sought information and applied to the plurality of first lines in the known digit order, the said drive lines being oriented so that each second field is applied in the same direction as or antiparallel to the respective first field according to the polarity of the signal causing that second field and the remanent state of the associated first core, any second field applied in the same direction as the respective first field being effective to rotate the remanent magnetization of the second core coupled hereto further from its preferred axis to a biased position, and any second field applied in the opposite direction to the respective first field being effective to rotate the remanent magnetization of the second core coupled thereto to a substantially unbiased position along its preferred axis, a plurality of second drive lines inductively coupled to said second cores for applying when respectively activated by a plurality of signals a third magnetic field thereto in each of the second cores inductively coupled thereto in a direction substantially antiparallel to the remanent magnetization thereof when lying parallel to its respective preferred axis of magnetization, each third field being insufficient in magnitude to switch the remanent state of any second core which has its remanent magnetization existing substantially in said unbiased position but being sufficient in magnitude to switch any second core which has its remanent magnetization existing at said biased position, and output means including a plurality of output lines inductively coupled to all the second cores in each column and oriented so that the magnetic axis of each lies parallel to the said preferred axis of each second core coupled thereto at least in the region of coupling, wherein each of said output lines has at least two segments of opposite sense so that any signal induced directly by a third field in either one of such segments is of opposite polarity to the signal so induced in the other of said segments for substantially cancelling any signals induced in said output lines by said direct coupling of any of said third field, said output means arranged for producing an output signal due to the change of state of any of said second cores.

3. A system for searching a plurality of word registers to determine which if any stores a given word or given partial word, comprising an array of memory elements respectively forming the digit orders of a plurality of word registers, each of said elements including a first bistable core for storing a binary digit by retaining its magnetization in one or the other of opposite directions along an easy magnetization axis and a second bistable core having its easy magnetization axis disposed transversely of the easy axis of said first core and its magnetization biased in one direction or another by the instant direction of magnetization of the first core, means for simultaneously applying respectively to a plurality of like digit orders of each of said registers binary input signals respectively representing given binary digits of information being sought in the registers, said input signals providing a field in a direction to be additive to or in opposition to the biasing of the respective second cores by said instant direction of magnetization of respective first cores of like digit orders according to the binary sense of the respective given binary digit, and the direction of magnetization of the respective first core to put each such second core in a substantially biased or substantially unbiased condition, a plurality of output lines respectively coupled to said word registers with each line being inductively coupled to each of the said second cores in its respective register, and means for simultaneously applying during the existence of said input signals a plurality of second signals respectively to those second cores in said like digit orders in each of said registers in the same direction for all such second cores, which is the direction of opposition to the magnetization of a second core in its said substantially unbiased condition, for causing on any said output line a substantial output signal only if at least one of the binary digits stored in the register coupled to that line is different than the said given binary digit represented by the said binary input signal applied to the digit order storing the said one binary digit, and at least some of said output lines disposed so as to have signals induced therein by direct air coupling to at least a respective one of the means for simultaneously applying the second signals and each such output line including signal cancelling means for substantially cancelling any such induced signal.

4. A system for searching a plurality of word registers to determine which if any stores a given word or given partial word, comprising an array of memory elements respectively forming the digit orders of a plurality of word registers, each of said elements including a first bistable core for storing a binary digit by retaining its magnetization in one or the other of opposite directions along an easy magnetization axis and a second bistable core having its easy magnetization axis disposed transversely of the easy axis of said first core and its magnetization biased in one direction or another by the instant direction of magnetization of the first core, means for simultaneously applying respectively to a plurality of like digit orders of each of said registers binary input signals respectively representing given binary digits of information being sought in the registers, said input signals providing a field in a direction to be additive to or in opposition to the biasing of the respective second cores by said instant direction of magnetization of respective first cores of like digit orders according to the binary sense of the respective given binary digit, and the direction of magnetization of the respective first core to put each such second core in a substantially biased or substantially unbiased condition, a plurality of output lines respectively coupled to said word registers with each line being inductively coupled to each of the said second cores in its respective register, and means for simultaneously applying during the existence of said input signals a plurality of second signals respectively to those second cores in said like digit orders in each of said registers in the same direction for all such second cores, which is the direction of opposition to the magnetization of a second core in its said substantially unbiased condition, for causing on any said output line a substantial output signal only if at least one of the binary digits stored in the register coupled to that line is different than the said given binary digit represented by the said binary input signal applied to the digit order storing the said one binary digit, and at least some of said output lines disposed so as to have signals induced therein by direct air coupling to at least a respective one of the means for simultaneously applying the second signals and each such output line including signal cancelling means for substantially cancelling any such induced signal, said signal cancelling means including in each said such output lie at least two segments of opposite signal-conducting sense so that any signal induced directly by a said second signal in either one of such segments is of opposite polarity to the signal so induced in the other of said segments.

5. A system for searching a plurality of word registers to determine which if any stores a given word or given partial word, comprising an array of memory elements respectively forming the digit orders of a plurality of word registers, each of said elements including a first bistable core for storing a binary digit by retaining its magnetization in one or the other of opposite directions along an easy magnetization axis and a second bistable core having its easy magnetization axis disposed transversely of the easy axis of said first core and its magnetization biased in one direction or another by the instant direction of magnetization of the first core, means for simultaneously applying respectively to a plurality of like digit orders of each of said registers binary input signals respectively representing given binary digits of information being sought in the registers, said input signals providing a field in a direction to be additive to or in opposition to the biasing of the respective second cores by said instant direction of magnetization of respective first cores of like digit orders according to the binary sense of the respective given binary digit, and the direction of magnetization of the respective first core to put each such second core in a substantially biased or substantially unbiased condition, a plurality of output lines respectively coupled to said word registers with each line being inductively coupled to each of the said second cores in its respective register, and means for simultaneously applying during the existence of said input signals a plurality of second signals respectively to those second cores in said like digit orders in each of said registers in the same direction for all such second cores, which is the direction of opposition to the magnetization of a second core in its said substantially unbiased condition, for causing on any said output line a substantial output signal only if at least one of the binary digits stored in the register coupled to that line is different than the said given binary digit represented by the said binary input signal applied to the digit order storing the said one binary digit, wherein said means for simultaneously applying during the existence of said input signals a plurality of second signals includes a plurality of drive lines respectively associated with said registers with each drive line being coupled to each second core in its respective register for applying said second signals aforesaid, each of said drive lines being disposed to extend generally parallel to its respective output line, at least some of said output lines having signals induced therein by air coupling, each output line, in its length between two successive second cores to which it is coupled, being substantially in the form of an "S" with the mid-section of the S extending substantially parallel to the respective drive line for substantially cancelling said induced signals.

6. A system for searching a plurality of word registers to determine which if any stores a given word or given partial word, comprising an array of memory elements respectively forming the digit orders of a plurality of word registers, each of said elements including a first bistable core for storing a binary digit by retaining its magnetization in one or the other of opposite directions along an easy magnetization axis and a second bistable core having its easy magnetization axis disposed transversely of the easy axis of said first core and its magnetization biased in one direction or another by the instant direction of magnetization of the first core, means for simultaneously applying respectively to a plurality of like digit orders of each of said registers binary input signals respectively representing given binary digits of information being sought in the registers, said input signals providing a field in a direction to be additive to or in opposition to the biasing of the respective second cores by said instant direction of magnetization of respective first cores of like digit orders according to the binary sense of the respective given binary digit, and the direction of magnetization of the respective first core to put each such second core in a substantially biased or substantially unbiased condition, a plurality of output lines, each of said output lines including at least two segments of opposite induced signal conducting sense, respectively coupled to said word registers with each line being inductively coupled to each of the said second cores in its respective register, and means for simultaneously applying during the existence of said input signals a plurality of second signals respectively to those second cores in said like digit orders in each of said registers in the same direction for all such second cores, which is the direction of opposition to the magnetization of a second core in its said substantially unbiased condition, for causing on any said output line a substantial output signal only if at least one of the binary digits stored in the register coupled to that line is different than the said given binary digit represented by the said binary input signal applied to the digit order storing the said one binary digit, wherein said means for simultaneously applying during the existence of said input signals a plurality of second signals includes a plurality of drive lines respectively coupled to the digit orders of all said registers with each drive line being coupled to each like digit order second core of every register for applying said second signals as aforesaid, each said drive line being disposed to extend generally perpendicular to each of said output lines except in the area of the intersections of the drive and output lines whereat each drive line extends generally parallel to the intersecting output line so as to apply a said second signal in the direction aforesaid but incidentally effecting an induced signal in a first induced signal conduction sense in the intersecting output line, each of said output lines, in its length between each two successive second cores to which it is coupled, having a section of induced signal conduction sense opposite said first induced conduction sense which extends substantially parallel with and is air coupled to the drive line portion that otherwise generally extends perpendicular to a respective intersected output line for substantially cancelling said induced signals.

7. A memory system comprising an array of memory elements forming a plurality of binary word registers with each said element storing a respective binary digit of its respective register, a plurality of output lines respectively coupled to said registers with each output line being coupled to each said element in its respective register, means coupled to said elements including a plurality of drive lines having at least in the areas of said elements portions which extend generally parallel and are directly air coupled to the respective output lines in those areas for incidentally inducing signals on said output lines due only to said direct air coupling, and means in said output lines for substantially cancelling any such incidentally induced signal.

References Cited by the Examiner

UNITED STATES PATENTS

| | | | |
|---|---|---|---|
| 2,973,508 | 2/61 | Chadurjian | 340—174 |
| 3,015,807 | 1/62 | Phom et al. | 340—174 |

OTHER REFERENCES

"Thin Films . . ." Electrical Manufacturing, vol. 61, No. 1, January 1958, pp. 95–98.

"Using Thin Films, etc." Eric E. Brittman, Electronics, June 5, 1959, pp. 55–57.

"Coincident Current, etc." Lewis J. Oakland, Journal of Applied Physics, Supp. to vol. 30, No. 4, April 1959, pp. 54S–55S.

IRVING L. SRAGOW, *Primary Examiner.*

EVERETT R. REYNOLDS, JOHN T. BURNS, *Examiners.*